Sept. 4, 1928.                    H. COHN                    1,682,775

THERMIONIC TUBE

Filed July 18, 1924

INVENTOR
HENNY COHN
BY
*HRvan Deventer*
ATTORNEY

Patented Sept. 4, 1928.

1,682,775

UNITED STATES PATENT OFFICE.

HENNY COHN, OF CHARLOTTENBURG, NEAR BERLIN, GERMANY, ASSIGNOR TO THE FIRM DR. ERICH F. HUTH GES. M. B. H., OF BERLIN, GERMANY.

THERMIONIC TUBE.

Application filed July 18, 1924, Serial No. 726,784, and in Germany September 18, 1923.

This invention relates to thermionic tubes for converting and amplifying electric currents, more particularly alternating currents of low or high frequencies, the tube being particularly useful in connection with oscillation receivers and transmitters.

Figure 1:
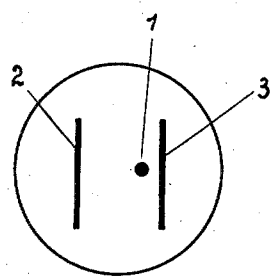
Figure 2:
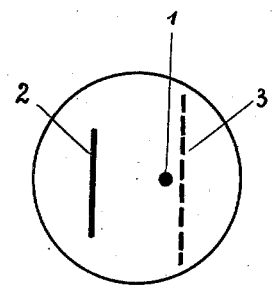

I will first explain the essence of the invention. If an incandescent filament 1, (see the diagram illustrated in Figure 1 showing the cross section of the tube) is arranged in a thermionic tube opposite a cold anode 2 and a controlling electrode (grid) 3 on the other side of the incandescent filament, which electrodes may be in the form of plates, a comparatively large current flows from the incandescent filament 1 to the plate-shaped controlling electrode 3, this being due to the comparatively large surface and required proximity of the controlling electrode with respect to the incandescent filament 1. Now, if the surface of the controlling electrode 3 is decreased by providing it with slits (see Figure 2) that is to say by making it in the form of a grid, the capacity of the controlling electrode of absorbing the current of electrons is decreased. Whilst it is true that by decreasing the surface of the controlling electrode the grid current is decreased, on the other hand the disadvantage is produced that the controlling effect (field effect) of the controlling electrode is reduced. In consequence thereof, the effective surface of the controlling electrode must be re-established as regards this field effect and this is effected by increasing the size of the controlling electrode. Hithereto the size of the anode and that of the controlling electrode in the case of plates have, at the most, been equal to one another. Now, according to the present invention the size of the controlling electrode is made larger than that of the anode, the effective surface thereof as regards the absorption of the current in the proximity of the incandescent filament, being reduced as hitherto.

Figure 3:
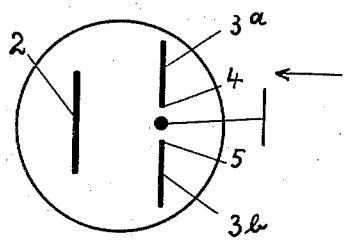
Figure 4:
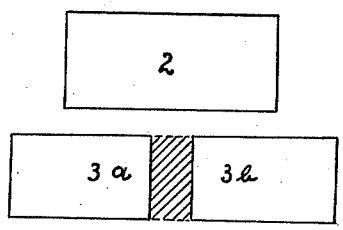

In this way the invention leads to a form of construction as illustrated in Figure 3 in which the controlling electrode 3 is subdivided into two plates $3^a$, $3^b$ which are electrically connected together and are arranged so that their edges should lie opposite the incandescent filament thereby reducing the capacity of absorbing the current to a minimum, whilst they face the anode with a large surface. The total surface of the plates $3^a$, $3^b$ facing the anode 2 and including the surface of the slit between the edges 4, 5 is larger than the surface of the anode 2. If we draw, looking in the direction of the arrow shown in Figure 3, for instance a rectangular anode 2 (see Figure 4) and below the same the surfaces of the controlling plates $3^a$, $3^b$, the surface of the anode 2 will be smaller than the sum of the surfaces of the plates $3^a$, $3^b$, plus the sectioned intervening surface formed by the gap between the two plates $3^a$, $3^b$.

It is not absolutely necessary that the plates $3^a$, $3^b$ and the metal filament 1 should be in one and the same plane. Thus the plates shown in Figure 3 may be shifted to a certain extent to the right so that they lie behind the filament.

It will thus be seen that according to the present invention a reduction in the absorption of the current takes place in those parts of the surfaces of the controlling electrode which lie near and opposite the filament and that a sufficiently large surface as compared with that of the anode is provided, whereby a good controlling effect is obtained.

Figure 5:
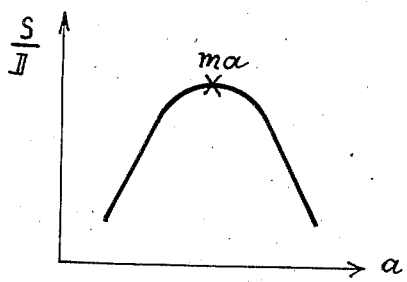

It is also more particularly to be pointed out that in this case it is possible to adjust the thermionic tube so as to effect a maximum efficiency. The efficiency G is determined by the ratio of the steepness S of the characteristic of the thermionic tube to the "grid permeability" D. By varying the distance of the anode from the filament whilst the distance of the controlling electrode from the filament is kept constant, an optimum of the efficiency of the tube is obtained for a determined distance of the anode from the filament, that is to say that the ratio $S:D$ becomes a maximum as is illustrated by the diagram in Figure 5 in which the variable distance of the anode from the filament A is indicated on the abscissæ axis and the efficiency $S:D$ on the ordinate axis. The optimum is indicated at $ma$.

Figure 6:
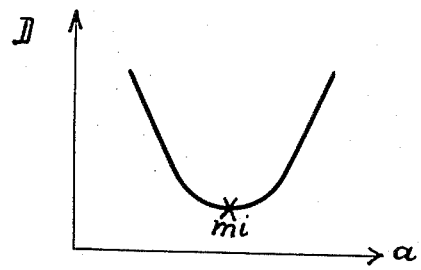

In the case of oscillation producing thermionic tubes it is often desired to make the grid permeability as small as possible without first of all taking into consideration the steepness of the characteristic. In that case the distance of the anode will be varied in such manner that the grid permeability becomes a minimum $mi$ as will be seen from the diagram shown in Figure 6 in which the variable anode distance *a* has been indicated on the abscissæ axis and the grid permeability D on the ordinate axis.

The arrangement according to the invention has the further advantage that the mounting is substantially facilitated in so far as a filament more particularly covered with a layer of an oxide can be easily passed through the gap between the parts of the controlling electrode or the slits provided thereon without the same touching the controlling electrode, thereby avoiding any damage being done to the layer of oxide.

Experiments have shown that the output of the tube even when made with a single anode is equal to the output of the constructions having two anodes and two controlling electrodes facing a common filament. The controlling current (grid current) is considerably reduced.

It is rather surprising that a positive bias may be given to the controlling electrode viz. grid (for instance 2 to 3 volts in the case of an anode voltage of 40 to 50 volts) without a pure detecting or rectifying effect being thereby produced. This is due to the fact that by the construction according to the present invention, the grid current (the flow of the electrons from the filament to the controlling electrode) is reduced to such an extent that only in the case of a positive bias of a few volts of the grid it again becomes noticeable; it is of course understood that the tube operates below the saturation bend of the characteristic.

I claim:

1. A thermionic device comprising a flat anode, a filament and a controlling element having a broad flat surface and a narrow edge, said controlling element being so arranged as to present said narrow edge toward said filament, and the combined areas of the broad flat surface of said controlling element and the space from said filament to said controlling element being larger than the surface area of said flat anode.

2. A thermionic device comprising an anode, a filament and a two-part controlling element disposed in parallel planes, said parts being electrically connected and said filament being arranged between said parts, the surface area of said parts and the space therebetween in one plane being larger than the surface area of said anode in another parallel plane.

3. A thermionic device comprising a flat anode, a filament and a slotted, flat controlling element, said filament being so arranged in said slot as to minimize the absorption of current between the controlling element and the filament and the controlling element being arranged in a plane parallel to said anode and protruding beyond the limits of the edges of said flat anode.

4. A thermionic tube comprising grid, filament and plate electrodes, said grid electrode consisting of a pair of flat rectangular elements disposed in the same plane spaced one from the other end to end, said filament electrode being disposed in the plane of said flat elements in the space between said elements, said plate electrode consisting of a flat element disposed in a plane parallel to the rectangle plane of said grid electrode, the rectangular envelope of said grid electrode being greater in area than the rectangular envelope defined by said plate electrode.

In testimony whereof I affix my signature.

HENNY COHN.